L. T. RASMUSSEN.
FURROW OPENER.
APPLICATION FILED NOV. 20, 1909. RENEWED MAR. 6, 1911.
989,872.
Patented Apr. 18, 1911.
2 SHEETS—SHEET 1.
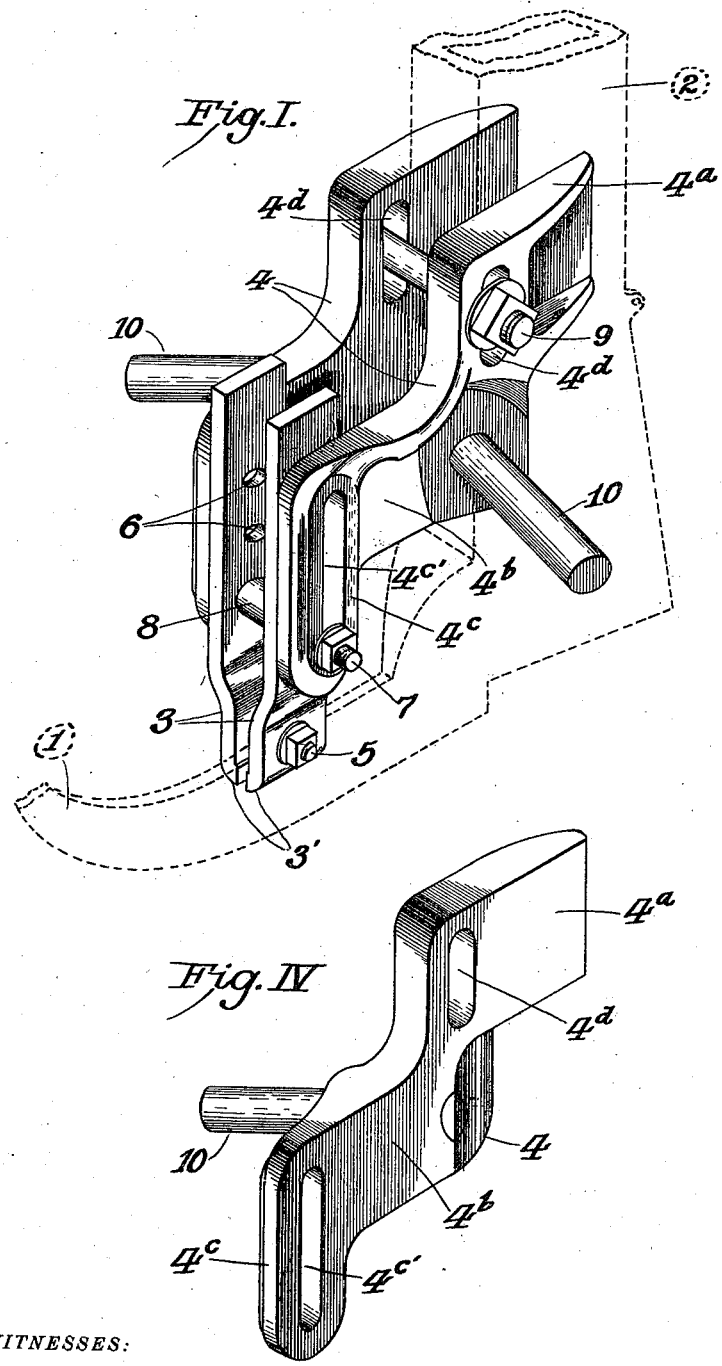
WITNESSES:
INVENTOR.
Laurits T. Rasmussen.
BY
ATTORNEY.

L. T. RASMUSSEN.
FURROW OPENER.
APPLICATION FILED NOV. 20, 1909. RENEWED MAR. 6, 1911.
989,872.
Patented Apr. 18, 1911.
2 SHEETS—SHEET 2.
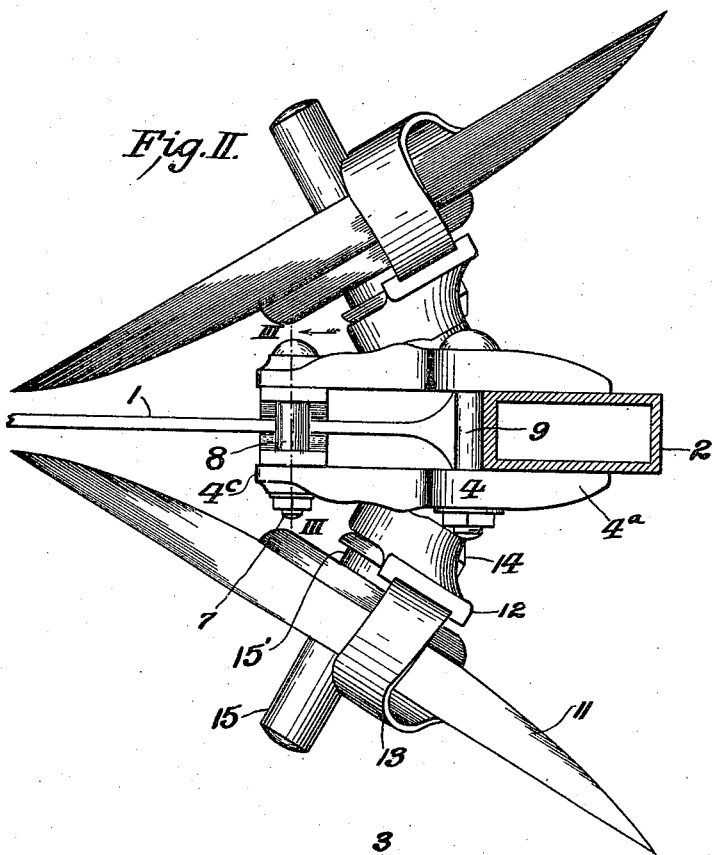
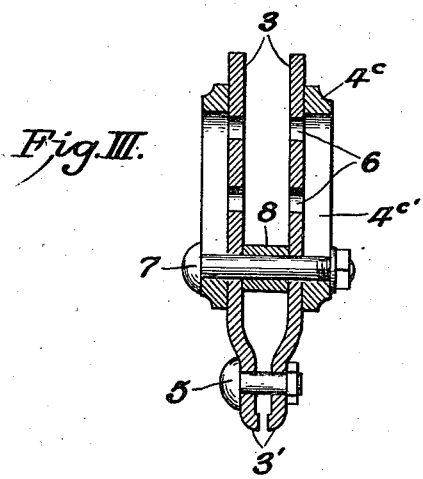
WITNESSES:
INVENTOR.
Laurits T. Rasmussen
BY
ATTORNEY.

UNITED STATES PATENT OFFICE.

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

989,872.  Specification of Letters Patent.  Patented Apr. 18, 1911.

Application filed November 20, 1909, Serial No. 529,076. Renewed March 6, 1911. Serial No. 612,689.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to furrow openers, and has for its object to provide a device of that class, which is simple and economical in construction, and may be easily and quickly applied to planters of ordinary construction. In accomplishing this object I have provided the improved details of construction herein described, pointed out in the claims, and illustrated in the accompanying drawings, in which:—

Figure I is a perspective view of the frame of the opener, omitting the disks, and showing in dotted lines the portion of a planter to which the frame is attached. Fig. II is a top plan view of the opener and portion of the seeder on which it is mounted, the seed-tube being in section. Fig. III is a vertical section taken on the line III—III of Fig. II. Fig. IV is a perspective detail view of one of the axle-holding members.

Referring more in detail to the parts: 1 designates the "shoe" and 2, the seed-tube of a well known form of corn planter, wherein the seed-tube is substantially vertical and is rigidly secured near its lower end to the "shoe".

The frame of the attachment comprises a pair of shoe-clamping members 3, and a two piece head block 4 having the tube-clamping jaws $4^a$ and shoe connecting part $4^b$, with means for securing the members in position.

The members 3 are substantially vertical and are placed with their lower ends 3' at opposite sides of the "shoe". Above the shoe, a bolt 5 passes through said members, securing them firmly upon the "shoe". Said members are provided with vertical series of bolt holes 6, any pair of which may receive a bolt 7. Upon the bolt, between members 3, is a spreader 8, preferably formed as a collar, as shown.

Each of the head block members 4 is formed with a rearwardly extending jaw $4^a$, and with a forwardly extending part $4^b$ having a downwardly extending part, $4^c$. The jaws $4^a$ are adapted to embrace or frictionally engage the sides of the seed-tube 2. Just forward of the seed-tube, each member 4 is formed with a bolt-opening $4^d$. As shown said openings are vertical slots, but they may be circular in form. The bolt 9 passes through said openings and holds the jaws $4^a$ in firm contact with the tube 2. The downwardly extending parts $4^c$ of the members $4^b$ are formed with vertical slots $4^{c'}$, through which the bolt 7 extends; and as the inner members 3 are held apart by the spreader 8, said bolt secures the outer members $4^c$ thereto and completes a rigid structure.

Each member 4 carries a disk-axle 10; said axles being forwardly inclined so as to hold the disks 11 with their forward parts in proximity.

Scraper brackets 12, carrying scrapers 13, are mounted on the axles 11 in contact with members 4 and are fixed thereon by set-screws 14. The disk hubs 15 have grooves 15' which are loosely engaged by downward projections (not shown) from the brackets 12, whereby the disks are held upon the axles. As said means of retaining the disks are well known, I have not illustrated the same in detail.

From the foregoing description it will be evident that the furrow-opening attachment is simple, economical in construction, and may be easily applied and adjusted. The height at which the disks are carried is regulable by adjusting the members vertically. When this is done the nuts on the bolts 7 and 9 are loosened, and the slotted parts $4^c$ adjusted vertically upon the bolt 7 correspondingly with the elevation of the jaws $4^a$.

Having thus described my invention, what I claim as new therein and desire to secure by Letters Patent is:—

1. A furrow opener comprising a two piece head block having jaws adapted for engaging the seed tube of a planter, means for clamping the jaws to the seed tube, shoe attaching members having adjustable connection with the head block, and a disk axle mounted on each of the head block members.

2. In a furrow opener, a two piece head block, each individual member of which is provided with a central body section, a rearwardly projecting jaw above the body section, a downwardly projecting part at the front of the body section adapted for receiving shoe attaching members at various positions of vertical adjustment, and shoe attaching members having means at their lower ends adapted for engagement with the shoe of a planter, and means above the shoe engaging parts for adjustable connection with the downwardly projecting head block members, for the purpose set forth.

3. In a furrow opener, a pair of head block members, each comprising a central block section, a rearwardly projecting jaw above the block section, a downwardly projecting part at the front of the block section, said jaws and said downwardly projecting parts being slotted vertically, and bolts adapted for vertical adjustment in said slots.

4. A furrow-opener comprising a pair of disk-holding members having rearwardly extending jaws and having forwardly and downwardly extending parts, the latter having vertical slots, a bolt passing through said members adjacent the jaws, and a bolt passing through the vertical slots in said members.

5. A furrow-opener comprising a pair of disk-holding members having rearwardly extending jaws and having forwardly and downwardly extending parts, the latter having vertical slots; a pair of shoe-engaging members arranged vertically between and in contact with the inner sides of the first named members, a bolt passing through said slots and shoe-engaging members, and a bolt passing through the disk-holding members adjacent the jaws thereof.

6. A furrow-opener comprising a pair of disk-holding members having rearwardly extending jaws and having forwardly and downwardly extending parts, the latter having vertical slots; a pair of shoe-engaging members arranged vertically between and in contact with the inner sides of the first named members, a bolt passing through said slots and shoe-engaging members, a bolt connecting said members below said bolt, and a bolt passing through the disk-holding members adjacent the jaws thereof.

In testimony whereof I affix my signature in presence of two witnesses.

LAURITS T. RASMUSSEN.

Witnesses:
G. F. SPOONER,
W. I. WALKER.

---

Copies of this patent may be obtained for five cents each, by addressing the "Commissioner of Patents, Washington, D. C."